(12) United States Patent
Grabau

(10) Patent No.: US 7,182,575 B2
(45) Date of Patent: Feb. 27, 2007

(54) METHOD OF OPERATING A WIND TURBINE

(75) Inventor: Peter Grabau, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 2 days.

(21) Appl. No.: 10/537,934

(22) PCT Filed: Dec. 16, 2003

(86) PCT No.: PCT/DK03/00883

§ 371 (c)(1), (2), (4) Date: Jun. 8, 2005

(87) PCT Pub. No.: WO2004/057182

PCT Pub. Date: Jul. 8, 2004

(65) Prior Publication Data

US 2006/0034692 A1  Feb. 16, 2006

(30) Foreign Application Priority Data

Dec. 20, 2002  (DK) .................. PA 2002 01963

(51) Int. Cl.
F03D 7/02  (2006.01)
(52) U.S. Cl. .................. 416/1; 416/39; 416/230; 416/241 R
(58) Field of Classification Search .......... 416/1, 416/37, 39, 147, 230, 241 R
See application file for complete search history.

(56) References Cited

U.S. PATENT DOCUMENTS

| 6,890,152 B1 * | 5/2005 | Thisted ............... 416/1 |
| 7,042,109 B2 * | 5/2006 | Gabrys ............... 290/44 |
| 2005/0008495 A1 * | 1/2005 | Wobben ............ 416/241 R |

FOREIGN PATENT DOCUMENTS

| DE | 299 23 485 U1 | 1/2001 |
| DE | 202 06 704 U1 | 9/2002 |
| WO | WO 00 79128 A1 | 12/2000 |

* cited by examiner

Primary Examiner—Edward K. Look
Assistant Examiner—Nathan Wiehe
(74) Attorney, Agent, or Firm—Cooper & Dunham LLP

(57) ABSTRACT

A wind turbine has a generator (7) with a connected rotor (3) having a hub (4) and blades (5) rotatably connected to the hub for adjusting the pitch angle. In a method of operating such a wind turbine under climatic conditions, where there is a risk of icing on the blades and no or weak wind, the generator is used as a motor for driving the rotor and the pitch angle of the blades is adjusted to ensure that the resulting wind substantially hits the leading edge of the blades. It is thus ensured that any icing only occurs on the leading edge of the blades. Any ice formed may be removed by means of de-icing in a known manner.

18 Claims, 1 Drawing Sheet

METHOD OF OPERATING A WIND TURBINE

TECHNICAL FIELD

The invention relates to a method of operating a wind turbine including a generator with a connected rotor having a hub and blades rotatably connected to the hub for adjusting the pitch angle.

Initially it should be noted that the phrase blades, which are rotatably connected to the hub for adjusting the pitch angle, covers pitch-controlled blades as well as active stall-controlled blades. On a pitch-controlled wind turbine, the blades are turned away from stall at increasing wind speeds, ie the pitch angle is increased such that the lift is limited. On an active stall-controlled wind turbine, the blades are turned in negative direction at high wind speeds, ie in the opposite direction from that used for pitch-controlled blades so as to obtain stall.

BACKGROUND ART

It is commonly known that wind turbines can be placed in areas, where the climatic conditions may cause icing on the wind turbine blades and on the rest of the wind turbine. The risk of ice formation is particularly high at low air temperatures and high humidity or precipitation.

During operation of the wind turbine, ie while the rotor rotates, icing occurs primarily on the blades in the leading edge areas of the blades. This icing may be critical in that the leading edge of the blades greatly affects the aerodynamic properties of the blades, for which reason an ice layer thereon significantly reduces the effect of the wind turbine. Icing on one or more of the blades may further cause an imbalance in the rotor and additional load on the mechanical parts of the turbine.

In order to prevent or at least reduce the problems with icing, either ice removal (also known as de-icing) or ice prevention (also known as anti-icing) is used today. At de-icing a layer of ice is allowed to form on the leading edge of the blade during turbine operation, said layer subsequently being removed at suitable intervals. At anti-icing ice is continuously prevented from forming on the blade, preferably by continuously heating the blade to a temperature above freezing point such that icing thereon does not occur.

De-icing can be performed mechanically, eg at the leading edge of the blade by means of inflatable rubber bellows or thermally by means of electric heating elements embedded in the surface of the blade and feeding hot air to the interior of the blade (known from DE 20 014 238 U1) or by means of microwave energy (known from WO 98/01340).

Anti-icing is primarily performed thermally by heating the entire blade. If only the leading edge is heated as at de-icing, the water produced at the melting of ice flows down towards the trailing edge of the blade and subsequently freezes to ice. At anti-icing it is thus necessary to heat the entire blade.

At present, at weak or no wind, the rotor is stopped or the wind turbine is allowed to idle, whereby the turbine is disconnected from the supply grid, and the rotor thus rotates slowly or stands still depending on the wind speed. In both cases, however, a fairly thick layer of ice forms on the blades, the tower and the nacelle in climatic conditions, where a risk of icing is present.

Before a wind turbine can be restarted and is able to operate efficiently, the ice has to be removed from the blades, which can be effected by heating the blades. The heating may for instance be effected by the methods described above in relation to anti-icing. The ice formed is thus loosened and drops to the ground prior to the start of the turbine.

However, the above described methods of preventing/removing ice from wind turbine blades are not optimum.

Furthermore, when a wind turbine stands still under certain climatic conditions, where there is a risk of icing, all of the turbine components, including the oil in the gear box and in the turbine's various hydraulic components, are chilled. In the stopped state of the turbine, no movement is present in the gear box oil or in the hydraulic oil. Furthermore, the load from the nacelle and the turbine blades rest on the same bearing balls or rollers in various lubrication-free bearings for a long time. Thus, starting the turbine from its stopped state causes more wear and tear than continuous operation of the turbine.

DESCRIPTION OF THE INVENTION

The object of the invention is to provide a method of controlling on which areas of a wind turbine blade icing occurs under certain climatic conditions and at the same time to prevent icing in other areas of a wind turbine blade. A particular object is to provide a method of operating a wind turbine blade, whereby icing is limited to the leading edge area of the blade. It is further the object of the invention to provide a method, whereby a more operational wind turbine blade is obtained in climatic conditions, where there is a risk of icing on the turbine blade, and at weak wind.

The method according to the invention is characterised in that in climatic conditions, where there is a risk of icing on the blades, and no or weak wind, the generator is used as a motor for the rotor, the rotational speed and pitch angle of the blades being adjusted such that icing occurs in areas of the blades, in particular in the leading edge area of the blades, where an ice abatement means is provided in form of a de-icing system or a surface structure or surface coating providing a water- and ice-repellent surface.

It should be noted that wind turbine blades usually are twisted such that the pitch angle of the blade per se is highest at the root and lowest at the tip, where the pitch angle typically is 0 degrees, for which reason the angle of incidence of the resulting wind varies over the length of the blade, the said adjustment of the pitch angle of the blades to be understood as a turning of the entire blade.

It should also be noted that the phrase no or weak wind denotes a wind speed of between 0 and 5 m/s, preferably a wind speed below 3 m/s.

Finally, it should be noted that the phrase resulting wind or wind speed denotes the resultant of the actual wind over the ground at the height of the blades (also named the free wind) and of the head wind due to the rotation of the blades.

In periods with no or weak wind, in which the turbine thus does not produce power for the supply grid, and in climatic conditions where there is risk of icing of the blades, the rotor is made to rotate by means of the turbine's own generator acting as a motor. At the same time the pitch angle of the blades is adjusted such that any icing occurs in the areas of the blades, where the ice abatement means is provided, ie. especially in the leading edge area of the blades. To some extent this operating state corresponds to normal operation such that icing only occurs on the leading edge of the blade and the pressure and suction sides of the blade are kept free from ice. It should be understood that the rotor is made to rotate at such a rotational speed that it is ensured that icing, if any, occurs substantially only at the leading edge of the blades. As a result, a de-icing system for removing ice from the leading edge of the blade is fully sufficient. The system for de-icing the leading edge of the blades may be any known type of de-icing system, eg one of the active mechanical or electric de-icing systems described above, but may also be a passive de-icing system in form of a special surface structure or coating providing a water- or ice-repellent surface. A combination of an active and a passive de-icing system may also be used.

Yet another advantage of the method according to the invention is that the driving of the rotor by means of the generator/motor allow for a quick and easy switch between standstill operation, where the rotor is driven by drawing power from the supply grid, and efficient operation, where the rotor is driven by the wind and produces power to the grid, due to the rotational speed of the rotor the wind turbine in principle being ready for an immediate switch, when the wind speed increases to allow production of power.

During a normal start from standstill, ie with a braked rotor, the rotor has to be set into rotation before being connected to the supply grid. The method according to the invention allows for a quick switch between idle operation and efficient operation at a short-time variation of the wind speed. The continuous operation of the turbine further reduces the wear of the mechanical parts of the turbine as compared to starting the turbine from complete standstill.

According to an embodiment of the invention the rotational speed and the pitch angle of the blades are adjusted such that the resulting wind hits the leading edge at an angle of incidence of between −30° and +30°, preferably of between −12° and +12° along the majority of the blade's length or put differently the angle between the chord of the blade and the direction of the resulting wind is between −30° and +30°, preferably between −12° and +12°. As a result the resulting wind substantially hits the leading edge along the majority of the blade's length, ie at least half or the outer two thirds of the length thereof.

According to another embodiment of the invention the pitch angle of the blade is adjusted so as to minimise the power consumption used for rotating the rotor. In practice, this means that a pitch angle close to 0° is chosen, the head wind force thus being minimised.

Furthermore according to the invention in the leading edge area the blades may be provided with a de-icing system being activated at intervals for removing the formed layer of ice.

In this connection the intervals between the activation of the de-icing system may be determined on the basis of the thickness of the formed layer of ice.

Optionally or in addition to the above the intervals between the activation of the de-icing system are determined on the basis of the climatic conditions, ie on the basis of measurement of the wind, the temperature, the humidity and the precipitation.

Moreover, in a particularly simple embodiment the de-icing system can be activated at fixed intervals.

Furthermore according to the invention the leading edge area of the blades may have a surface structure or a surface coating providing a water- and ice-repellent surface. In theory it should thus be possible to completely prevent icing on the blades, and at least to obtain a reduction of the ice accumulation rate and of the thickness of the formed ice layer. By combining this embodiment with an actual de-icing system, which may be a mechanical de-icing system in form of inflatable, flexible bellows provided at the leading edge, or a thermal de-icing system for instance in form of heating elements at the leading edge of the blade, the intervals between activation of the de-icing system can be considerably increased.

Moreover according to the invention by using the generator as a motor the rotor may be made to rotate at a rotational speed of at least 2 m/s when measured at the blade tip.

Furthermore according to the invention by using the generator as a motor the rotor can be made to rotate at the same constant rotational speed.

Finally according to the invention the generator may intermittently be used as a motor to make the rotor rotate at a predetermined first rpm, the generator/motor then being disconnected from the supply grid to allow the rotor to idle freely, until a predetermined second rpm is reached, the generator subsequently being used as motor again, until the first predetermined rpm is reached once again.

BRIEF DESCRIPTION OF THE DRAWINGS

A simple embodiment of the method according to the invention is explained in detail below with reference to the drawing, in which.

BEST MODE(S) FOR CARRYING OUT THE INVENTION

Figure 1:
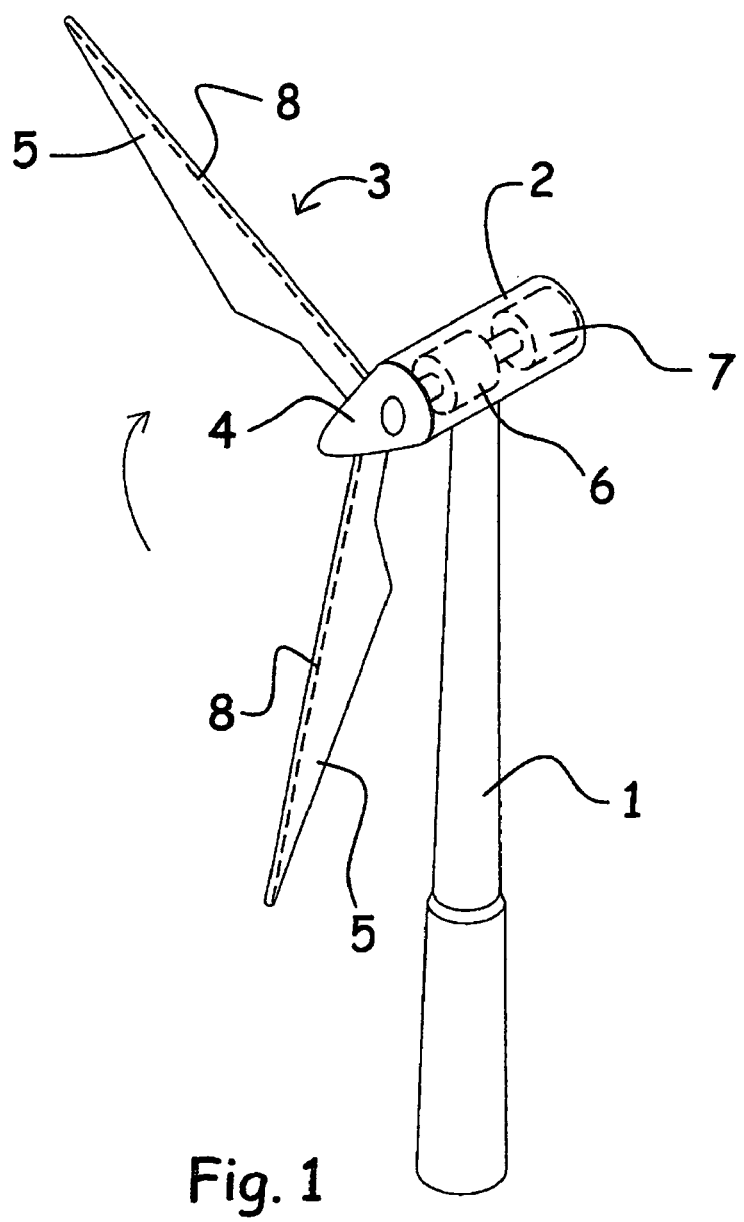
FIG. 1 is a diagrammatic view of a wind turbine on which the method according to the invention can be carried out.
Figure 2:
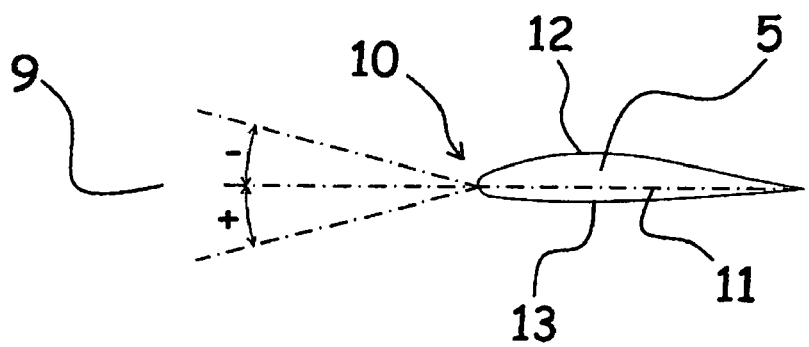
FIG. 2 is a cross-sectional view of a blade profile, the angle of incidence of the resulting wind being illustrated.

The wind turbine shown in FIG. 1 includes a tower 1 on top of which a nacelle 2 is arranged, said nacelle being rotatable in relation to the tower about a vertical axis. On the a nacelle 2 a rotor 3 is rotatably arranged about a horizontal axis, said rotor 3 having a rotor hub 4 and connected thereto three blades 5 of which only two are shown. Each of the blades 5 is rotatably connected to the hub to allow adjustment of the pitch angle of the blades. In the interior of nacelle a gear box 6 and a generator 7 connected to the gear box are shown diagrammatically, said gear 6 box being connected to the rotor. Each of the blades 5 has a suction side 12 and a pressure side 13 (confer FIG. 2).

It is now assumed that the generator is an asynchronous generator with a rotational speed of 1500 rpm. According to prior art a wind turbine of this type would be disconnected from the power grid at no wind or light winds, ie typically at wind speeds below 3 m/s, and dependent on the wind the rotor would be allowed to rotate slowly. However, the control system of the wind turbine monitors the rotational speed continuously. When a specific speed level is reached, power from the supply grid is switched on such that the rotor rotates at its nominal rpm when the wind increases, whereby the turbine is able to produce power. The wind turbine including the pitch angle of the blades is subsequently controlled in a known manner for production of power. In subsequent periods with no or weak wind, the turbine is once more disconnected from the grid.

However, at the method according to the invention in climatic conditions, where there is a risk of icing on the blades and no or weak wind, the turbine remains connected to the supply grid, the asynchronous generator acting as a motor and rotating the rotor optionally by means of a frequency converter. At the same time the pitch angle of the blades is adjusted to allow the resulting wind to hit the leading edges thereof at an angle of preferably between −12° and +12°, whereby their chords 11 form an angle 9 of between −12° and +12° with the resulting wind direction (confer FIG. 2.) This feature is obtained by selecting a pitch angle of the blades close to 0°, the head wind force and thus the energy consumption used for rotating the rotor thereby being minimised. As a result icing, if any, will only occur on leading edge 10 of the blades. Ice formed on the leading edge 10 is, however, removed at intervals by activating heating elements 8 arranged at the leading edge 10 of the blades such that any formed layer of ice is loosened and drops off.

In a simple embodiment of the invention the heating elements 8 are activated at predetermined intervals in climatic conditions where there is a risk of icing. If the turbine has a variable rotational speed, it is advantageous to allow the rotor to rotate at the lowest rpm ensuring that the resulting wind hits the leading edge of the blades at an angle of incidence of between −30° and +30°, preferably between −12° and +12° along the majority of the blade's length. A pitch angle on the blades close to 0° is advantageous. In all a reduction in the power consumption for rotation of the rotor is obtained at the same time as it is ensured that icing occurs on the leading edge of the blades at least along the majority of the lengths thereof, ie along the outer half or the outer two thirds.

The invention claimed is:

1. Method of operating a wind turbine including a generator (7) with a connected rotor (3) having a hub (4) and blades (5) rotatably connected to the hub (4) for adjusting the pitch angle characterised in that under climatic conditions, where there is a risk of icing on the blades (5) and no or weak wind, the generator (7) is used as a motor for driving the rotor (3), the rotational speed and pitch angle of the blades being adjusted such that icing occurs in areas of the blades where an ice abatement means is provided in form of a de-icing system or a surface structure or surface coating providing a water- and ice-repellent surface.

2. Method according to claim 1, wherein the rotational speed and the pitch angle of the blades are adjusted to allow the resulting wind to hit the leading edge (10) of the blades at an angle of incidence of between −30° and +30° along the majority of the length of the blades.

3. Method according to claim 2 wherein said angle is between −12° and +12°.

4. Method according to claim 2, wherein the pitch angle of the blade is adjusted so as to minimise the power consumption used for rotating the rotor.

5. Method according to claim 2, wherein in the leading edge areas the blades are provided with a de-icing system being activated at intervals for removing the formed layers of ice.

6. Method according to claim 2, wherein in the leading edge area of the blades have a surface structure or a surface coating providing a water- and ice-repellent surface.

7. Method according to claim 2, characterised in that by using the generator as a motor the rotor is made to rotate at the same constant rotational speed.

8. Method according to claim 2, characterised in that the generator is intermittently used as a motor to make the rotor rotate at a predetermined first rpm, the generator/motor then being disconnected from the supply grid to allow the rotor to idle freely, until a predetermined second rpm is reached, the generator subsequently being used as motor, until the first predetermined rpm is reached once again.

9. Method according to claim 1, wherein the pitch angle of the blade is adjusted so as to minimise the power consumption used for rotating the rotor.

10. Method according to claim 1, wherein in the leading edge areas of the blades are provided with a de-icing system being activated at intervals for removing the formed layers of ice.

11. Method according to claim 10, wherein the intervals between the activation of the de-icing system are determined on the basis of the thickness of the formed layer of ice.

12. Method according to claim 10, wherein the intervals between the activation of the de-icing system are determined based on the climatic conditions.

13. Method according to claim 12 wherein said climatic conditions include wind, temperature, humidity and precipitation.

14. Method according to claim 10, characterised in that the intervals between activation of the de-icing system are fixed.

15. Method according to claim 1, wherein in the leading edge area of the blades have a surface structure or a surface coating providing a water- and ice-repellent surface.

16. Method according to claim 1, characterised in that by using the generator as a motor the rotor is made to rotate at the same constant rotational speed.

17. Method according to claim 1, characterised in that the generator is intermittently used as a motor to make the rotor rotate at a predetermined first rpm, the generator/motor then being disconnected from the supply grid to allow the rotor to idle freely, until a predetermined second rpm is reached, the generator subsequently being used as motor, until the first predetermined rpm is reached once again.

18. Method according to claim 1 wherein said areas are leading edge areas of the blades.

* * * * *